US008568632B2

(12) United States Patent  
Rynd et al.

(10) Patent No.: US 8,568,632 B2
(45) Date of Patent: Oct. 29, 2013

(54) METHOD OF FORMING THERMOPLASTIC FOAMS USING NANO-PARTICLES TO CONTROL CELL MORPHOLOGY

(75) Inventors: Joseph P. Rynd, Stow, OH (US); Roland R. Loh, Stow, OH (US); Raymond M. Briendel, Hartville, OH (US)

(73) Assignee: Owens Corning Intellectual Capital, LLC, Toledo, OH (US)

( * ) Notice: Subject to any disclaimer, the term of this patent is extended or adjusted under 35 U.S.C. 154(b) by 0 days.

(21) Appl. No.: 10/722,929

(22) Filed: Nov. 26, 2003

(65) Prior Publication Data

US 2005/0112356 A1    May 26, 2005

(51) Int. Cl.
    *B29C 44/00* (2006.01)
    *B29C 44/20* (2006.01)
    *B29C 44/22* (2006.01)

(52) U.S. Cl.
    USPC ............. 264/45.3; 264/45.9; 264/50; 264/51; 264/53; 264/54; 264/211; 521/79; 521/80

(58) Field of Classification Search
    USPC ..................................................... 264/41–55
    See application file for complete search history.

(56) References Cited

U.S. PATENT DOCUMENTS

| | | | |
|---|---|---|---|
| 2,365,086 A | 12/1944 | Kamowski | |
| 3,574,644 A | 4/1971 | Olstowski et al. | |
| 3,627,480 A * | 12/1971 | Birchall | 423/431 |
| 3,673,290 A | 6/1972 | Brubaker et al. | |
| 4,229,396 A | 10/1980 | Suh et al. | |
| 4,301,040 A | 11/1981 | Berbeco | |
| 4,385,156 A | 5/1983 | Ingram et al. | |
| 4,394,460 A * | 7/1983 | Chung et al. | 521/92 |
| 4,692,381 A | 9/1987 | Pecsok | |
| 4,857,390 A | 8/1989 | Allen et al. | |
| 4,996,109 A | 2/1991 | Krieg et al. | |
| 5,010,112 A * | 4/1991 | Glicksman et al. | 521/76 |
| 5,082,608 A | 1/1992 | Karabedian et al. | |
| 5,130,342 A | 7/1992 | McAllister et al. | |
| 5,147,896 A | 9/1992 | York | |
| 5,186,919 A | 2/1993 | Bunnell | |
| 5,234,967 A * | 8/1993 | Takezawa et al. | 521/131 |
| 5,366,675 A | 11/1994 | Needham | |
| 5,369,135 A | 11/1994 | Campbell et al. | |
| 5,489,407 A | 2/1996 | Suh et al. | |
| 5,550,170 A | 8/1996 | Trager et al. | |
| 5,674,916 A * | 10/1997 | Shmidt et al. | 521/79 |
| 5,679,718 A | 10/1997 | Suh et al. | |
| 5,710,186 A | 1/1998 | Chaudhary | |
| 5,719,199 A | 2/1998 | Wallace et al. | |
| 5,753,161 A | 5/1998 | Lightle et al. | |
| 5,776,389 A * | 7/1998 | Chaudhary | 264/50 |
| 5,779,775 A | 7/1998 | Kuwabara | |
| 5,853,752 A | 12/1998 | Unger et al. | |
| 5,854,295 A * | 12/1998 | Suh et al. | 521/82 |
| 5,869,544 A * | 2/1999 | Shmidt et al. | 521/79 |
| 5,912,279 A | 6/1999 | Hammel et al. | |
| 5,977,197 A | 11/1999 | Malone | |
| 5,993,707 A | 11/1999 | Chaudhary et al. | |
| 5,997,781 A | 12/1999 | Nishikawa et al. | |
| 6,048,909 A | 4/2000 | Chaudhary et al. | |
| 6,093,752 A | 7/2000 | Park et al. | |
| 6,123,881 A * | 9/2000 | Miller et al. | 264/50 |
| 6,130,265 A | 10/2000 | Glueck et al. | |
| 6,133,333 A | 10/2000 | Chaudhary et al. | |
| 6,174,471 B1 | 1/2001 | Park et al. | |
| 6,197,233 B1 | 3/2001 | Mason et al. | |
| 6,213,540 B1 | 4/2001 | Tusim et al. | |
| 6,231,795 B1 | 5/2001 | Chaudhary et al. | |
| 6,242,540 B1 | 6/2001 | Crevecoeur et al. | |
| 6,258,864 B1 | 7/2001 | Dalton | |
| 6,340,713 B1 | 1/2002 | Gluck et al. | |
| 6,350,789 B1 | 2/2002 | Miller et al. | |
| 6,355,341 B1 * | 3/2002 | Chaudhary et al. | 428/314.8 |
| 6,358,864 B1 | 3/2002 | Chang et al. | |
| 6,362,242 B1 | 3/2002 | Gluck et al. | |
| 6,384,094 B1 | 5/2002 | Glueck | |
| 6,384,095 B1 | 5/2002 | Corr et al. | |
| 6,387,968 B1 | 5/2002 | Gluck et al. | |
| 6,395,795 B1 | 5/2002 | Hrivnak | |

(Continued)

FOREIGN PATENT DOCUMENTS

| | | |
|---|---|---|
| CN | 1057228 | 12/1991 |
| CN | 1170662 | 1/1998 |

(Continued)

OTHER PUBLICATIONS

Zeng et al—"Polymer/Clay Nanocomposite Foams Prepared by CO2".
Han et al—"Extrusion of Polystyrene Foams Reinforced with Nano-Clays".
International Search Report PCT/US2005/045291 dated May 12, 2006.
International Search Report PCT/US2006/035056 dated Feb. 20, 2008.
International Search Report PCT/US2008/068543 dated Jul. 23, 2008.

(Continued)

*Primary Examiner* — Jeffrey Wollschlager
(74) *Attorney, Agent, or Firm* — Calfee, Halter & Griswold LLP

(57) ABSTRACT

A process for making closed-cell, alkenyl aromatic polymer foams using nano-particle nucleation agents to control the cell morphology of the resulting foam includes forming a polymer melt at a temperature above the polymer glass transition temperature (for crystal polymers) or the polymer melt point (for amorphous polymers); incorporating selected nano-particles into the polymer melt; incorporating blowing agents into the polymer melt at an elevated pressure; optionally incorporating other additives, such as flame retardants, into the polymer melt; and extruding the polymer melt under conditions sufficient to produce a foam product having a desired cell morphology, characterized by parameters such as reduced average cell size range and/or increased asymmetry of the cells.

18 Claims, 6 Drawing Sheets

(56) References Cited

U.S. PATENT DOCUMENTS

| | | | |
|---|---|---|---|
| 6,417,240 | B1 | 7/2002 | Park |
| 6,420,442 | B1 | 7/2002 | Dietzen et al. |
| 6,518,324 | B1 * | 2/2003 | Kresta et al. ............. 521/83 |
| 6,521,672 | B1 | 2/2003 | Gluck et al. |
| 6,589,646 | B1 * | 7/2003 | Morgenstern ............. 428/318.6 |
| 6,617,295 | B2 * | 9/2003 | Nitzsche ............. 510/188 |
| 6,696,504 | B1 * | 2/2004 | Hayashi et al. ............. 521/79 |
| 6,699,454 | B1 * | 3/2004 | Moy et al. ............. 423/447.2 |
| 6,759,446 | B2 * | 7/2004 | Lee et al. ............. 521/83 |
| 6,815,491 | B2 * | 11/2004 | Adedeji et al. ............. 524/504 |
| 6,818,163 | B1 * | 11/2004 | Fibiger et al. ............. 264/51 |
| 6,844,055 | B1 * | 1/2005 | Grinshpun et al. ............. 428/304.4 |
| 6,864,298 | B2 * | 3/2005 | Maletzko et al. ............. 521/57 |
| 6,908,950 | B2 * | 6/2005 | Loh et al. ............. 521/79 |
| 7,071,258 | B1 * | 7/2006 | Jang et al. ............. 524/496 |
| 7,160,929 | B1 * | 1/2007 | Tan ............. 521/73 |
| 7,605,188 | B2 | 10/2009 | Loh |
| 2001/0036970 | A1 | 11/2001 | Park |
| 2002/0006976 | A1 | 1/2002 | Subramonian et al. |
| 2002/0022672 | A1 | 2/2002 | Thunhorst et al. |
| 2002/0041955 | A1 | 4/2002 | Watanabe et al. |
| 2002/0086908 | A1 | 7/2002 | Chou et al. |
| 2002/0096797 | A1 * | 7/2002 | Stoffelsma et al. ............. 264/45.9 |
| 2002/0121717 | A1 | 9/2002 | Chaudhary et al. |
| 2002/0155270 | A1 | 10/2002 | Chaudhary et al. |
| 2002/0168509 | A1 | 11/2002 | De Simone et al. |
| 2003/0082343 | A1 | 5/2003 | Brucker |
| 2003/0162852 | A1 | 8/2003 | Chaudhary et al. |
| 2003/0175497 | A1 | 9/2003 | Kobe et al. |
| 2003/0205832 | A1 | 11/2003 | Lee et al. |
| 2004/0127621 | A1 | 7/2004 | Drzal et al. |
| 2004/0167240 | A1 | 8/2004 | Burgun et al. |
| 2004/0209782 | A1 | 10/2004 | Zhang et al. |
| 2004/0234443 | A1 * | 11/2004 | Chen et al. ............. 423/432 |
| 2005/0027040 | A1 * | 2/2005 | Nelson et al. ............. 523/216 |
| 2005/0048276 | A1 | 3/2005 | Wilson |
| 2005/0112356 | A1 | 5/2005 | Rynd et al. |
| 2006/0014908 | A1 | 1/2006 | Rotermund et al. |
| 2006/0148916 | A1 | 7/2006 | Loh et al. |
| 2008/0287560 | A1 | 11/2008 | Loh |
| 2011/0064938 | A1 | 3/2011 | Breindel |

FOREIGN PATENT DOCUMENTS

| | | | |
|---|---|---|---|
| DE | 199 07 663 | | 8/2000 |
| DE | 199 10 257 | | 9/2000 |
| DE | 10229983 | | 1/2004 |
| DE | 2004 019708 | | 11/2005 |
| EP | 353701 | | 2/1990 |
| EP | 0515125 | | 11/1992 |
| EP | 620 246 | | 10/1994 |
| EP | 0 729 999 | | 4/1996 |
| EP | 0 863 175 | | 9/1998 |
| EP | 0921148 | | 2/2000 |
| EP | 1024163 | * | 8/2000 |
| EP | 0675918 | | 9/2000 |
| EP | 97/02457 | | 10/2000 |
| EP | 1 205 437 | | 5/2002 |
| EP | 1 209 189 | | 5/2002 |
| EP | 99/04867 | | 5/2002 |
| EP | 0922554 | | 6/2003 |
| EP | 01214372 | | 12/2005 |
| JP | 63-183941 | | 7/1988 |
| JP | 11-504359 | | 4/1999 |
| JP | 2002-212330 | | 7/2002 |
| JP | 2002-521543 | | 7/2002 |
| JP | 2003-292664 | | 10/2003 |
| JP | 2004-196907 | | 7/2004 |
| JP | 2005-002268 | | 1/2005 |
| JP | 2007-512425 | | 5/2007 |
| KR | 2001-0071028 | | 7/2001 |
| WO | WO 97/31053 | | 8/1997 |
| WO | WO 98/03581 | | 1/1998 |
| WO | WO 99/31170 | | 6/1999 |
| WO | WO 99/47592 | | 9/1999 |
| WO | WO 00/34363 | | 6/2000 |
| WO | WO 00/34365 | | 6/2000 |
| WO | WO 01/40362 | | 6/2001 |
| WO | WO 01/39954 | * | 7/2001 |
| WO | WO0140362 | * | 7/2001 |
| WO | WO03/055804 | * | 7/2003 |
| WO | WO 2004/003063 | | 1/2004 |
| WO | WO 2004/065461 | | 8/2004 |
| WO | WO 2004/067577 | | 8/2004 |
| WO | WO 2004/078785 | | 9/2004 |
| WO | WO 2005/054349 | | 6/2005 |
| WO | WO 2006/009945 | | 1/2006 |
| WO | WO 2006/009980 | | 1/2006 |
| WO | WO 2006/073712 | | 7/2006 |
| WO | WO 2008/005022 | | 1/2008 |

OTHER PUBLICATIONS

Zhang, et al., Preparation and Combustion Properties of Flame Retardant SBA Copolymer/Graphite Oxide Nanocomposites, Marcromol, Mater Eng., Mar. 2004, 289, 355-59.

Cassegneau, et al, Preparation and Characterization of Ultrathin Films Layer-by-Layer Self Assembled from graphite Oxide Nanoplatelets and Polymer, Langmuir, 2000, 16, 7318-24.

Guo-Hua Chen, Da-Jun Wu, Wen-Gui Wang and Wen-Li Yan; Dispersion of Graphite Nanosheets in a Polymer Matrix and the Conducting Property of the Nanocomposites; Polymer Engineering and Science, Dec. 2001, vol. 41, No. 12; pp. 2148-2154.

Pan, Y.X., Yu, Z.Z, Ou, Y.C., Hu, G.H.; A new process of fabracating electrically conducting nylon 6/graphite nanocomposites via intercalation polymerization, Journal of Polymer Science: Part B: Polymer Physics, 38, 1626-1633 (2000).

Xiao, P., Xiao, M., Gong, K.; Preparation of exfoliated graphite/polystyrene composite by polymerization-filling technique, Polymer, 42, 4813-4816 (2001).

Chen, G.H., Wu, D.J., Weng, W.G., Yan, W L., Preparation of polymer/graphite conducting nanocomposite by intercalation polymerization, Journal of Applied Polymer Science, 82, 2506-2513 (2001).

Uhl, F.M. and Wilkie, C.A., Polystyrene/graphite nanocomposites: effect on thermal stability, Polymer Degradation and Stability, 76, 111-122 (2002).

Modesti, M., Lorenzetti, A., Simioni, F., Camino, G., Expandable graphite as an Intumescent flame retardant in polyiscoyanurate-polyurethane forms, Polymer Degradation and Stability, 77, 195-202 (2002).

Drzal, L.T. and Fukushima, H., Graphite nanoplatelets as reinforcements for polymers, Polymers Preprints (American Chemical Society, Division of Polymer Chemistry) 42 (2), 42-43 (2001).

International Search Report from PCT/USO4/39336 dated Apr. 7, 2005.

International Search Report from PCT/US06/26490 dated Aug. 16, 2007.

Office action from U.S. Appl. No. 11/481,130 dated Dec. 3, 2009.

Notice of Abandonment from U.S. Appl. No. 11/481,130 dated Jul. 12, 2010.

Office action from U.S. Appl. No. 11/026,011 dated May 17, 2007.

Office action from U.S. Appl. No. 11/026,011 dated Jul. 31, 2008.

Office action from U.S. Appl. No. 11/026,011 dated Feb. 4, 2009.

Office action from U.S. Appl. No. 11/026,011 dated May 8, 2009.

Notice of Allowance from U.S. Appl. No. 11/026,011 dated Aug. 3, 2009.

Communication from European Application No. 04811960.6 dated Jun. 15, 2011.

Communication from European Application No. 06800020.7 dated May 17, 2010.

Zabel et al. "Graphite Intercalation Compounds I: Structure and Dynamics" (1990), Cover Pages and Table of Contents, copyright Springer-Verlag Berlin Heidelberg, printed in Germany, 13 pgs.

Office action from Chinese Application No. 200580046678.2 dated Oct. 14, 2011.

Mantell, C.L. "Carbon and Graphite Handbook", (1968), Cover pages and Table of Contents, Interscience Publishers copyright John Wiley & Sons, Inc., printed U.S. 11 pages.

(56) References Cited

OTHER PUBLICATIONS

Office action from Chinese Application No. 200580046678.2 dated Jul. 6, 2011.
Office action from Chinese Application No. 200580046678.2 dated Apr. 6, 2011.
Office action from Chinese Application No. 200580046678.2 dated Dec. 11, 2009.
Office action from Canadian Application No. 2,545,007 dated Jun. 23, 2011.
Office action from Australian Application No. 2005323239 dated Sep. 5, 2011.
Office action from New Zealand Application No. 547,067 dated Nov. 3, 2008.
Office action from Korean Application No. 2006-7009466 dated May 6, 2011.
Office action from Indian Application No. 1139/KOLNP/2006 dated Nov. 28, 2008.
Office action from Indian Application No. 1139/KOLNP/2006 dated Nov. 26, 2009.
Office action from Chinese Application No. 200480035089.x dated Sep. 7, 2007.
Office action from Chinese Application No. 200480035089.x dated Aug. 15, 2008.
Office action from Chinese Application No. 200480035089.x dated Nov. 28, 2008.
Office action from Chinese Application No. 200480035089.x dated Jun. 5, 2009.
Office action from Japanese Application No. 2006-541658 dated Mar. 22, 2011.
Office action from Japanese Application No. 2007-549422 dated Sep. 11, 2011.
Office action from Mexican Application No. 07/07970 dated Jun. 14, 2010.
Office action from Mexican Application No. 06/05995 dated Oct. 19, 2009.
Office action from Mexican Application No. 06/05995 dated Feb. 4, 2010.
Office action from Australian Application No. 2004295331 dated Aug. 4, 2009.
Office action from Australian Application No. 2005323239 dated Jul. 26, 2010.
Office action from Japanese Application No. 2007-549422 dated Oct. 11, 2011.
Office action from U.S. Appl. No. 12/769,144 dated Feb. 14, 2012.
Office action from Chinese Application No. 200680044295.6 dated Nov. 3, 2010.
Office Action from Canadian Application No. 2,592,281 dated Jun. 27, 2012.
Interview Summary from U.S. Appl. No. 12/769,144 dated Apr. 27, 2012.
Office action from Canadian Application No. 2,545,007 dated Apr. 30, 2012.
Office action from Korean Application No. 2007-7017520 dated Jun. 22, 2012.
Office Action from Canadian Application No. 2,545,007 dated Jan. 22, 2013.
Office Action from U.S. Appl. No. 12/769,144 dated Jan. 16, 2013.
Office action from U.S. Appl. No. 12/769,144 dated Jun. 29, 2012.
Office Action from U.S. Appl. No. 12/769,144 dated Jun. 7, 2013.

* cited by examiner

METHOD OF FORMING THERMOPLASTIC FOAMS USING NANO-PARTICLES TO CONTROL CELL MORPHOLOGY

BACKGROUND OF THE INVENTION

1. Field of the Invention

This invention relates to a process for making alkenyl aromatic polymer rigid foams having a wide range of cell morphologies by utilizing nano-particles as nucleating agents. Such rigid foams are useful for forming rigid insulating foam boards suitable in many conventional thermal insulation applications.

2. Description of the Related Art

The physical properties of rigid polymer foam boards, such as their compressive strength, thermal conductivity, dimensional stability, water absorption rate, depend in large part on the micro-structure of the material forming the boards, i.e., the cell morphology of the foam. However, it can be difficult to control polymer foaming to the degree necessary for consistent production of a desirable cell morphology that will tend to optimize the overall foam properties, or to improve a specific property, such as the thermal insulation value of the foam.

Prior art attempts to make foam micro-structures having desirable cell morphologies have included the use of nucleation agents such as powders formed from inorganic oxides, various organic materials and metals. Among these nucleation agents, the inorganic oxides, such as talc, titanium dioxide and kaolin, are the most commonly used. The size, shape, particle distribution and surface treatment of the nucleation agent(s) utilized to form a foam will all tend to affect the nucleation efficiency and, consequently, the cell size morphology and distribution in the resulting foam.

Conventional methods for controlling the cell morphology, however, tend to be limited by difficulties in evenly distributing particles of the nucleation agent throughout the polymer and/or suppressing agglomeration of the dispersed particles. Certain structural defects in the resulting foams are generally attributed, at least in part, to dimensional differences between the particles of the nucleating agents—which may be in the range of several microns, particularly in situations where there has been some degree of agglomeration—and the desired cell microstructures—which may have a target cell wall thickness of one micron or less—for a low density commercial insulation foams.

This size difference between the nucleation agent particles and the cell wall thickness may also result in relatively weak interactions between the nucleating agent and nano-scale polymer, thereby weakening the overall foam structure. Similarly, cell defects may also be attributed, at least in part, to the hydrophilic surface of most conventional inorganic nucleation agents that makes them difficult to disperse evenly in a polymer. These effects tend to result in processing difficulties, such as corrugation of the resulting foam board, when nucleation agents are added at levels greater than about 2 weight percent or the median cell size of the resulting foam is less than around 120 microns.

Prior art attempts to avoid foam structure corrugation effects have utilized cell size enlarging agents such as the waxy compositions disclosed in U.S. Pat. No. 4,229,396, the contents of which are hereby incorporated by reference in their entirety, and the non-waxy compositions disclosed in U.S. Pat. No. 5,489,407, the contents of which are hereby incorporated by reference in their entirely.

Another effort directed toward foam structures having bi-modal cell morphology (Kanelite Super EIII, Kaneka, Japan) included use of immiscible blowing agents, such as water and hydrocarbon. This combination, however, tends to result in processing difficulties due to the low solubility of water in the polymer and the reaction of water with fire retardant, such as hexabromocyclododecane (HBCD) at the elevated temperatures typically utilized during the extrusion process.

SUMMARY OF THE INVENTION

The present invention provides a process for making a closed-cell, alkenyl aromatic polymer foam in which nano-particle nucleation agents are utilized to control the cell morphology. The exemplary process comprises: 1) heating an alkenyl aromatic polymer to the temperature above the glass transition temperature of the polymer (for crystal polymer), or melt point of the polymer (for amorphous polymer) to form a polymer melt; 2) incorporating an appropriate amount of selected nano-particles into the polymer melt to alter the polymer property and process behavior, such as rheology, melt strength; 3) incorporating blowing agents into the polymer melt at elevated pressure; 4) incorporating other additives, such as flame retardants into the polymer melt; and 5) extruding and forming a foam board under an atmospheric or sub-atmospheric pressure (partial vacuum) to produce a desired cell morphology, characterized by parameters such as cell size range and distribution, cell orientation and cell wall thickness.

Further according to the present invention, the nano-particles are typically particles with at least one dimension less than 100 nm and may be incorporated into the polymers as surface modified nano-particles, nano-particles having mechnochemical bonds to a core micron sized particle, nano-particle compounds in combination with polymers, such as master batch compositions, and/or liquid blowing agents. Further, the nanoparticle polymer compounds can be intercalated nano-layers, such as compounds formed simply by mixing nano-Montmorillonite (MMT) or expanded graphite with a polymer, or exfoliated nano-layers, such as compounds formed by the in-situ polymerization of polymer precursors in the presence of nano-MMT or other surface-modified inorganic or graphite particles.

A first exemplary embodiment of the present invention provides a process for making a rigid polymer foam having a relatively small median cell size of around 60 microns by using surface modified hydrophobic nano-MMT particles. Conventional foams, in comparison, tend to have a median cell size of more than 150 microns produced by using conventional inorganic nucleating agents such as hydrophilic talc. The rigid foams prepared according to this embodiment of the invention exhibited no detectable corrugation and an improvement in compressive strength of around 30%.

A second exemplary embodiment of the present invention provides a process for producing rigid foams having an increased cell orientation of at least about 1.4, compared with a conventional cell orientation of about 1.0, was observed by adding needle-shaped nano-particles of, for example, calcium carbonate, in addition to a conventional nucleating agent, such as talc.

A third exemplary embodiment of the present invention provides a process for forming an improved foam structure using a carbon dioxide blowing agent in combination with a nano-scale nucleating agent, such as nano-MMT, to produce a rigid foam having a reduced median cell size and thinner cell walls both to improve mechanical strength and decrease thermal conductivity (thereby increasing the insulation value) of the resulting foam.

DETAILED DESCRIPTION OF EXEMPLARY EMBODIMENTS

Figure 1:
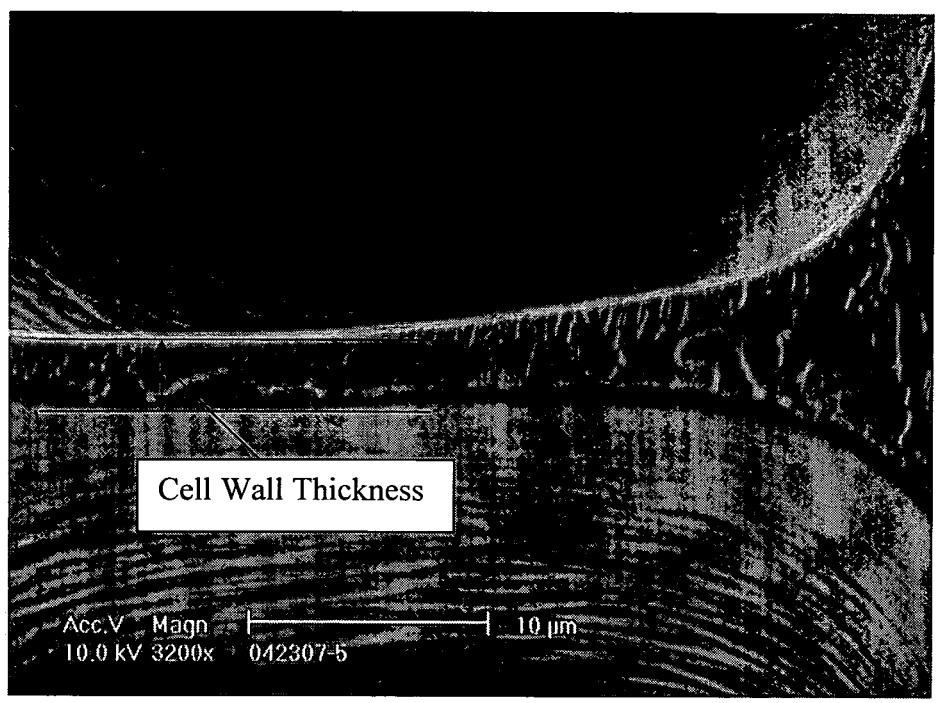
FIG. 1 shows an SEM image of the cell wall structure of a typical XPS foam.
Figure 2:
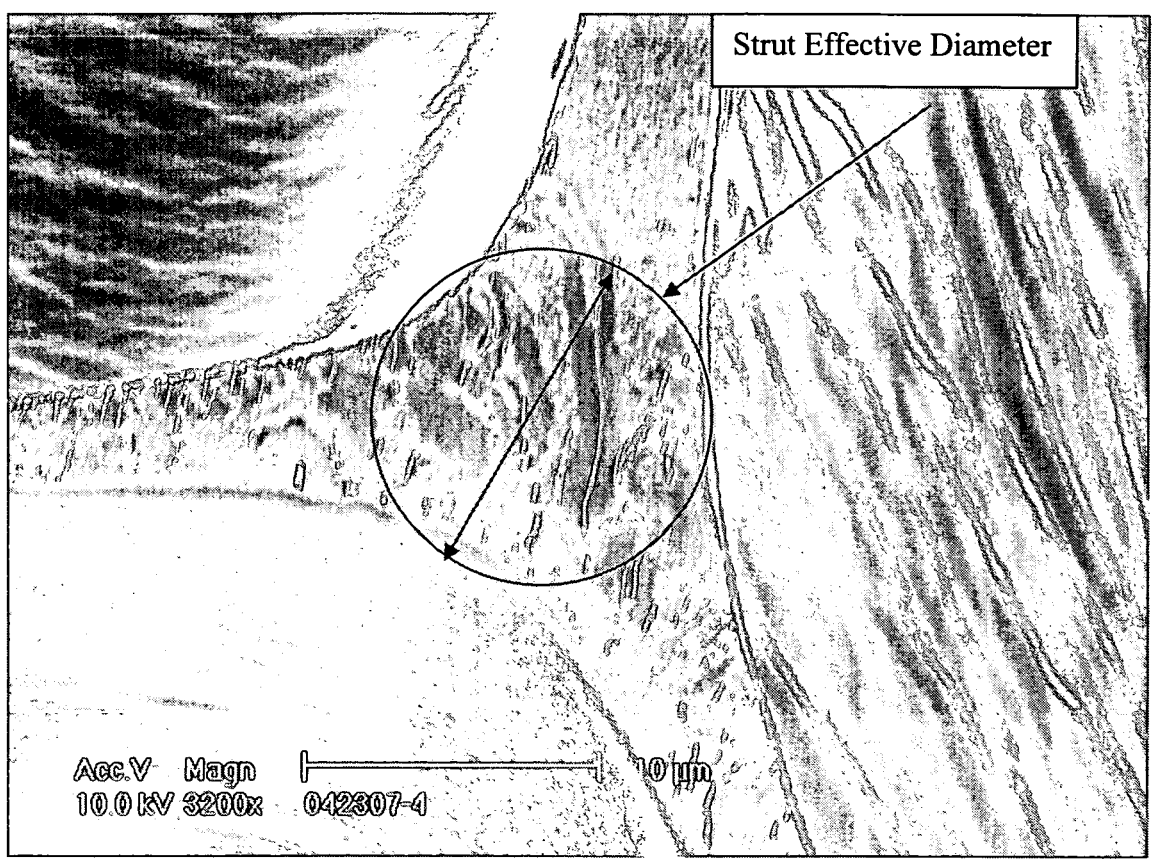
FIG. 2 shows an SEM image of the cell strut structure of a typical extruded polystyrene ("XPS") foam.

The cell morphology includes parameters such as cell mean size, cell anisotropic ratio or cell orientation, cell density, cell size distribution, cell wall thickness, cell strut effective diameter, open/closed cell ratio, cell shape, such as pentagonal dodecahedral, rhombic dodecahedron, tetra dodecahedral (with curved surface), and other models of cells such as bi-cell and cell-in-cell models. Within these cell morphology parameters, cell mean size, cell wall thickness, cell strut effective diameter, and cell orientation are the key parameters for determining the foam physical properties of closed cell foams. FIGS. 1 and 2 show the SEM imagines of the cell wall and strut structure of a typical XPS foam. If a polymer foam is ideally depicted as a close wall of pentagonal dodecahedral cells in a uniform size, the cell wall thickness and the strut effective diameter then depend primarily on the density of the foam and the cell size.

This invention uses nano-particles and a related extrusion process for controlling the cell size, cell wall thickness, strut effective diameter, as well as cell orientation within a relatively broad range. Although conventional polymer foams tend to exhibit a cell mean size in the range between about 120 and 280 microns. By utilizing the nano-particle technology according to the present invention, it is possible to manufacture polymer foam structures having a cell mean size from several tens of microns to several hundred microns. The nano-particles utilized in manufacturing polymer foams according to the present invention are preferably included in the polymer melt at a rate of between about 0.01 to about 10 weight %, or, more preferably, from about 0.05 to about 2.5 weight % of the alkenyl aromatic polymer material.

The particle size of the present nano-particle cell size controlling agent is typically no greater than 100 angstroms in at least one dimension, and may be an organic or inorganic material either with or without surface modification. The primary component of the foam structure is an alkenyl aromatic polymer material. Suitable alkenyl aromatic polymer materials include alkenyl aromatic homopolymers and copolymers of alkenyl aromatic compounds and copolymerizable ethylenically unsaturated co-monomers.

The alkenyl aromatic polymer material may further include minor proportions of non-alkenyl aromatic polymers. The alkenyl aromatic polymer material may be comprised solely of one or more alkenyl aromatic homopolymers, one or more of each of alkenyl aromatic homopolymers and copolymers, or blends of any of the foregoing with a non-alkenyl aromatic polymer. Suitable alkenyl aromatic polymers include those derived from alkenyl aromatic compounds such as styrene, alpha-methylstyrene, chlorostyrene, bromostyrene, ethylstyrene, vinyl benzene, and vinyl toluene. A preferred alkenyl aromatic polymer is at least 95% polystyrene and may be composed completely of polystyrene.

The present foam structure will also typically include one or more blowing agents selected from 1) organic blowing agents, such as aliphatic hydrocarbons having 1-9 carbon atoms (including, for example, methane, ethanol, ethane, propane, n-butane and isopentane) and fully or partially halogenated aliphatic hydrocarbons having 1-4 carbon atoms (fluorocarbons, chlorocarbons and chlorofluorocarbons); 2) inorganic blowing agents, such as carbon dioxide, nitrogen and water; and 3) chemical blowing agents, such as azodicarbonamide, p-toluenesulfonyl. Useful blowing agents include 1-chloro-1,1-difluoroethane (HCFC-142b), HCFC-134a, carbon dioxide, blends of HCFC-142b with carbon dioxide, HCFC-134a with carbon dioxide, carbon dioxide with ethanol, or carbon dioxide with water. The foam composition may also incorporate various additives, such as flame retardants, mold release aids, pigments and fillers, intended to improve the processing of the foam or modify one or more properties of the resulting foam.

Exemplary embodiments of polymer foam manufactured according to the present invention can exhibit densities of from about 10 to about 500 $kg/m^3$, but will more preferably have densities of from about 20 to about 60 $kg/m^3$ when measured according to ASTM D-1622. Although the polymer foams manufactured according to the present invention may have structures exhibiting both closed cells and open cells, preferred foam compositions will have at least 90 percent closed cells as measured according to ASTM D2856-A.

The following are examples of the present invention, and are not to be construed as limiting. Unless otherwise indicated, all percentages, parts, or proportions are based on weight of the total composition.

EXAMPLES

A series of exemplary and comparative foam structures were prepared and evaluated to determine cell morphology, i.e., cell size, cell wall thickness (FIG. 1), effective diameter of cell strut (FIG. 2), cell anisotropy ratio, and certain other properties related to the foam cell morphology.

The physical properties tested included one or more of density, compressive strength, thermal conductivity, aged thermal insulation value, thermal dimensional stability. In connection with these examples, cell size was measured according to ASTM D3576; density was measured according to ASTM D1622; thermal conductivity was measured according to ASTM C518; compressive strength was measured according to ASTM D1621; and thermal dimensional stability was measured according to ASTM D2126.

The foam structures were made with a twin co-rotated screw extruder comprising a pair of extruder screw, a heating zone mixer, a blowing agent injector, a cooler, a die and a shaper in accord with the operational conditions listed below in Table 1. Unless otherwise indicated, the polymer utilized in preparing the example foam compositions was an AtoFina granular polystyrene having a weight average molecular weight ($M_w$) of about 250,000, and melt index of about 3.1 gm per 10 minutes.

TABLE 1

|  | LMP Co-rotating Twin Screw Extruder with Static Cooler | Leistritz MIC 27 GL/400 Co-rotating Twin Screw Extruder |
| --- | --- | --- |
| Die/Shaper | Flat face die/Shaper plate | 20 × 2 mm Flat Slot Die |
| Forming Atmosphere | Atmosphere/Vacuum | Atmosphere |
| Throughput—kg/hr. | 100-200 | 6-10 |
| Wt. % of HCFC-142b | 10.5-11.5 |  |
| Wt. % of HCFC-142b/22 |  |  |
| Wt. % of $CO_2$ |  |  |
| Mixing Temperature—° C. | 210-230 | 200-220 |
| Extruder Pressure—kPa (psi) | 13000-17000 (1950-2400) | 6900-8300 (1000-1200) |
| Die Melt Temperature—° C. | 117-123 | 130-160 |
| Die Pressure—kPa (psi) | 5400-6600 (790-950) | 5500-8000 (800-1150) |
| Line Speed—m/hr (ft/min) | 108-168 (5.9-9.2) | 90-80 (5-10) |
| Die Gap—mm | 0.6-0.8 | 2 |
| Vacuum—kPa (inch Hg) | 0-3.4 (0 to 16) | Atmosphere |

Example 1

Polystyrene foams were prepared both with (7347) and without (7346) a 2.5% nano-particle loading using an LMP extruder. The nano-particle used to prepare this Example was an organoclay, specifically grade Nano-MMT 20A from Southern Clay Products Inc., that was melt compounded with a polystyrene polymer, specifically grade CX5197 from Ato-Fina, to form a melt polymer. The nano-particles exhibited an intercalated nano-MMT layer structure when examined using X-ray diffraction. The comparison sample did not include any nano-particles, but incorporated 0.8% talc loading as the nucleating agent. The comparison sample exhibited an average cell size of around 186 microns while the exemplary example utilizing the nano-particle foam exhibited a significantly reduced average cell size of around 60 microns. The exemplary example also exhibited a cell wall thickness of around 0.5 micron, and a strut effective diameter of around 5 microns. As reflected below in Table 2, the exemplary foam composition did not exhibit corrugation, was processed without undue process difficulty and provided improvements in compressive strength of around 30%.

TABLE 2

| Sample | Nano-Particle Wt. % | Average Cell micron | Cell Anisotropic Ratio* | Density kg/m$^3$ | Strength kPa | Thickness mm |
| --- | --- | --- | --- | --- | --- | --- |
| 7346 | 0 | 186 | 0.949 | 29.28 | 286 | 37 |
| 7347 | 2.5 | 62 | 0.968 | 32 | 372 | 26 |

*Cell anisotropic ratio: $K = z/(x \cdot y \cdot z)^{1/3}$ where, x, an average cell size in the longitudinal (extruding) direction, y, cell size in the transverse direction, and z, cell size in the board thickness direction

Example 2

Figure 3:
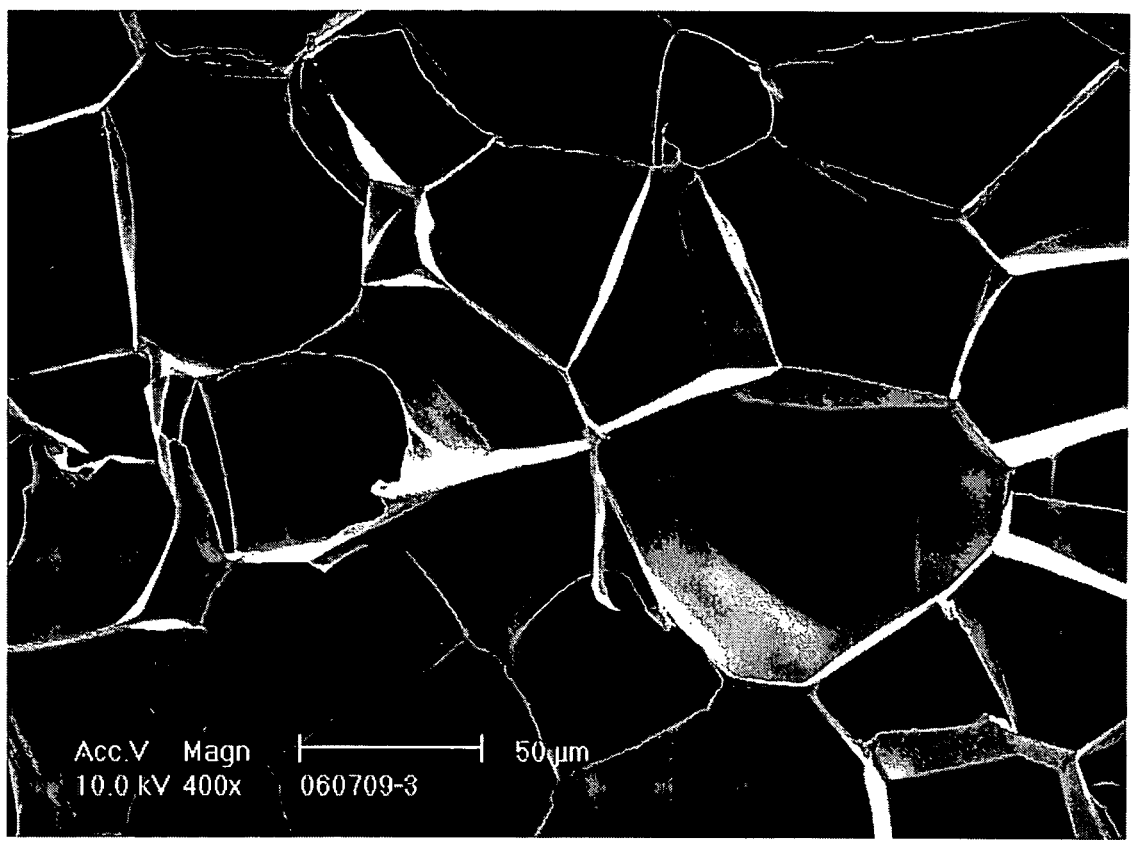
FIG. 3 shows an SEM image of an XPS foam with average cell size of about 81 microns produced with about 0.5% of a nano-clay nucleating agent.

Sample foams (7349) were produced according to the process outlined in Example 1, but using 0.5% of an intercalated nano-MMT in a polystyrene composition to produce an exemplary foam having a density of about 26.5 kg/m$^3$, a thickness of about 38 mm and a width of about 600 mm. The reduction in the amount of nano-MMT incorporated into the composition resulted in a slightly increased cell size, about 83 microns (FIG. 3), compared with Example 1, while maintaining improved strength, 329 kPa, over the comparative foam compositions.

Example 3

Figure 4:
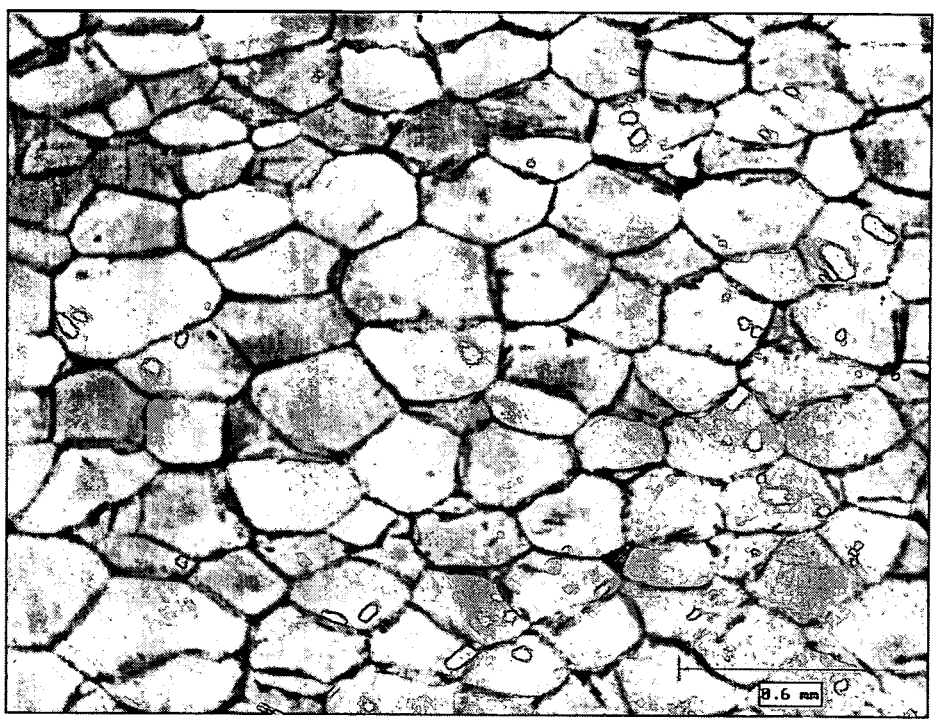
FIG. 4 shows an optical microscope image of the cell size, cell size distribution, and cell orientation (x/z) of an XPS foam with 2% nano-calcium carbonate.

Foams (7790) were prepared using a nano-particle loading of 2% nano-calcium carbonate from Ampacet, along with 1% talc as an additional nucleating agent and 1% of stabilized hexabromocyclododecone as fire retardant agent in a LMP extruder. The nano-calcium carbonate particles were typically elongated, having average dimensions of 80 nm×2 μm, and were provided in a 50% master batch composition in combination with an olefinic copolymer carrier resin. The rest of formulation was polystyrene: 80% Nova 1220 (Melt Index=1.45) and 16% Nova 3900 (Melt Index=34.5). The exemplary foam produced was 28 mm thick, 400 mm wide and had an average cell size of 230 microns with a cell orientation—the ratio of the cell dimension in the extrusion direction to the cell dimension in the thickness direction (x/z)—as high as 1.54 (see FIG. 4).

Example 4

Figure 5:
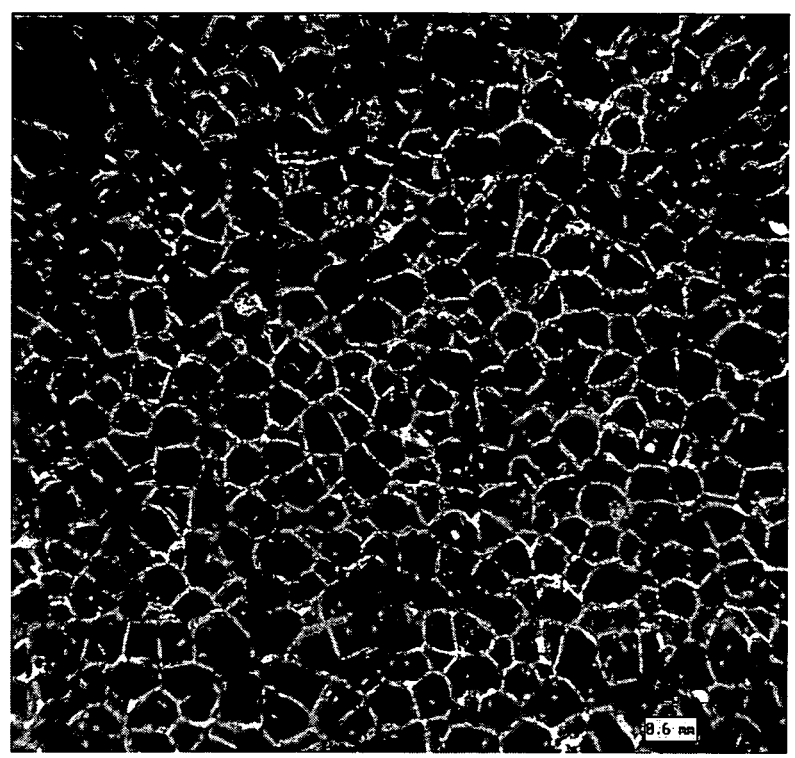
FIG. 5 shows an optical microscope image of the cell size, cell size distribution, and cell orientation (x/z) of an XPS foam with 3.3% of a nano-expanded graphite nucleating agent.

Foams (7789) were produced as in Example 3, but used 3.3% intercalated expanded nano-graphite from Superior Graphite Company as the nano-particles. The nano-expanded graphite included nano-sheets of graphite having thicknesses ranging from about 10 to about 100 nm and widths of around 3 μm. The exemplary foam exhibited substantially the same thickness, width, and density (49 kg/m$^3$) as Example 3, but had a smaller average cell size of 166 microns and cell orientation value of 1.21 (see FIG. 5). The thermal conductivity of this foam is as low as 0.14 K.m$^2$/W for samples after being aged for 20 days.

Example 5

Foams (7289, 7291) were prepared using a Leistritz extruder to produce samples having a thickness of around 10 mm, a width of around 50 mm, and a density of around 46 kg/m$^3$. Both samples with 0.5% of talc as nucleating agent, and 10% of HCFC142b/22 as blowing agent. Some characters of cell morphology are summarized as Table 3:

TABLE 3

| Sample | Nano-Particle* Wt. % | Average Cell micron | Cell Orientation x/z | Cell Size x | Cell Size y | Cell Size z | Cell Wall Thickness micron | Strut Effective Diameter micron |
| --- | --- | --- | --- | --- | --- | --- | --- | --- |
| 7289 | 0 | 341 | 0.99 | 355 | 359 | 339 | 1.8 | 4.2 |
| 7291 | 5 | 174 | 0.95 | 165 | 183 | 173 | 0.8 | 5.1 |

Example 6

Figure 6:
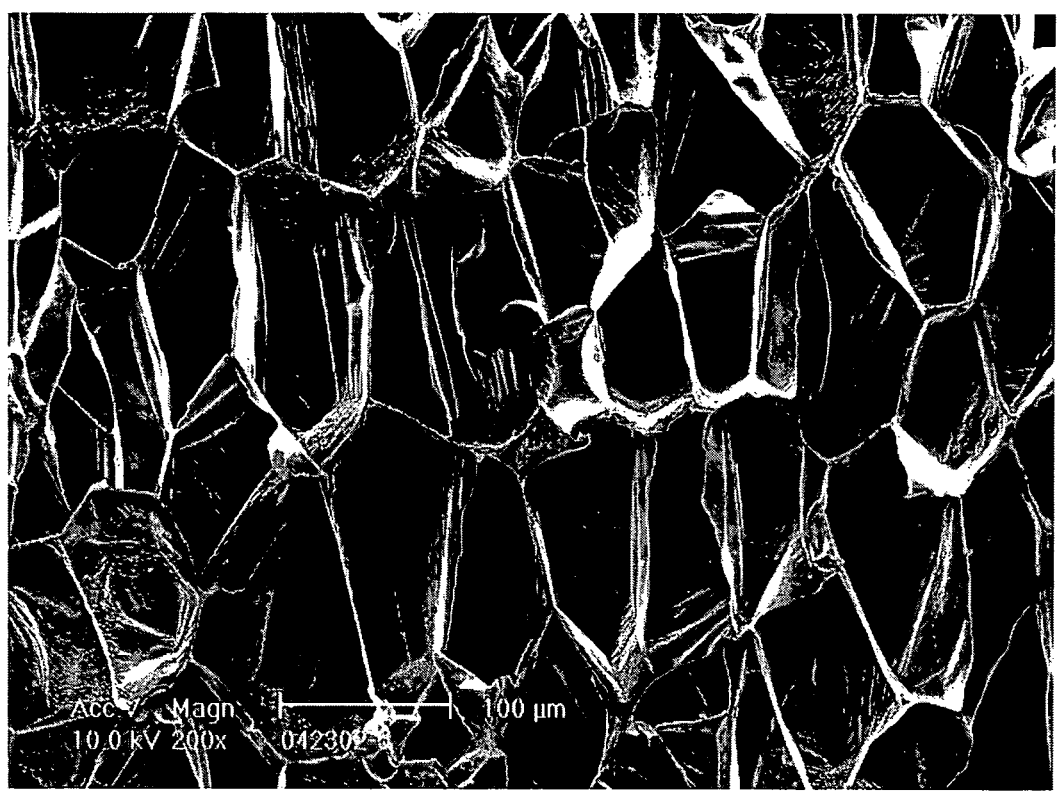
FIG. 6 shows an SEM cell morphology image of an XPS foam sample prepared using 5% nano-MMT as a nucleating agent and 6% $CO_2$ as a blowing agent.

Foams (7293, 7294) were prepared as in Example 5, but using 6 wt % of carbon dioxide as the blowing agent and 0.2 wt % of talc as a conventional nucleating agent. Some characteristics of the resulting cell morphologies (FIG. 6) are summarized below in Table 4:

TABLE 4

| Sample | Nano-Particle* Wt. % | Average Cell micron | Cell Orientation x/z | Cell Size x | Cell Size y | Cell Size z | Cell Wall Thickness micron | Strut Effective Diameter micron |
|---|---|---|---|---|---|---|---|---|
| 7293 | 0 | 380 | 0.92 | 355 | 396 | 388 | 1.4 | 3 |
| 7294 | 5 | 146 | 0.76 | 146 | 121 | 158 | 0.3 | 5.4 |

While exemplary embodiments of the process of the present invention have been described with reference to specific details and parameters, those of ordinary skill in the art will appreciate the disclosed process encompasses a variety of components and operating conditions that may be customized to produce a range of manufacturing processes and foam compositions that can be tailored to achieve a desired foam composition properties or adapted to a particular manufacturer's equipment without departing from the spirit and scope of the present invention as defined in the following claims.

What is claimed is:

1. A method of manufacturing a rigid foam board consisting essentially of:
    incorporating nano-particle nucleating agents into a polymer melt consisting of polystyrene, said nano-particle nucleating agents being selected from the group consisting of nanosheets of graphite, intercalated graphites and expanded graphites and having a particle size in at least one dimension of less than 100 nanometers;
    incorporating a blowing agent into the polymer melt under a first pressure and at a first temperature;
    extruding the polymer melt under a second pressure and at a second temperature, the second pressure and second temperature being sufficient to allow the polymer melt to expand and form a foam board having a solid foam structure; and
    cooling the foam board, said foam board having an average cell size between 60 μm and 500 μm and having a cell size distribution, wherein the average cell size is decreased by incorporation of the nano-particle nucleating agents,
    wherein said foam board comprises at least 90% closed cells, having an average cell wall thickness between 0.2 and 1 μm;
    an average strut diameter between 4 and 8 μm;
    a cell orientation between 1 and 1.5; and
    a foam density between 20 and 50 kg/m$^3$, and wherein the nano-particle nucleating agents are present in the polymer melt in an amount from 0.01 to 10 weight percent of the polymer.

2. A method of manufacturing a rigid foam board according to claim 1:
    wherein the blowing agent includes at least one composition selected from aliphatic hydrocarbons having 1-9 carbon atoms, halogenated aliphatic hydrocarbons having 1-4 carbon atoms, carbon dioxide, nitrogen, water, azodicarbonamide and p-toluenesulfonyl.

3. A method of manufacturing a rigid foam board according to claim 2:
    wherein the blowing agent includes at least one composition selected from methane, methanol, ethane, ethanol, propane, propanol, n-butane, isopentane, carbon dioxide, nitrogen, water, azodicarbonamide, p-toluenesulfonyl, HCFC-142b and HCFC-134a.

4. A method of manufacturing a rigid foam board according to claim 1, further comprising:
    incorporating an additive before forming the foam.

5. A method of manufacturing a rigid foam board according to claim 4:
    wherein the additive includes at least one composition selected from flame retardants, mold release agents, pigments and fillers.

6. A method of manufacturing a rigid foam board according to claim 1:
    wherein the nano-particle nucleating agents are incorporated into the polymer melt at a rate between 0.5 and 5 weight percent, based on polymer weight.

7. A method of manufacturing a rigid foam board according to claim 1:
    wherein the nano-particle nucleating agents are formed by a technique selected from intercalation with polystyrene and exfoliation of expandable graphite particles in a polystyrene or polymethyl methacrylate matrix.

8. The method according to claim 1, wherein the cell size distribution is bimodal, with a first peak centered between 50 μm and 120 μm and a second peak centered above 200 μm.

9. The method according to claim 1, wherein incorporating the nano-particle nucleating agents increases the asymmetry of the cells.

10. A method of manufacturing a rigid foam board according to claim 1, wherein said nano-particle nucleating agents are the only solid, inorganic nucleating agents.

11. A method of manufacturing a rigid foam product comprising:
    incorporating nano-graphite nucleating agents into a polymer melt consisting of polystyrene in an amount between about 0.01 and 10 weight percent, based on polymer weight, and said nano-graphite nucleating agents having a particle size in at least one dimension of less than 100 nanometers and being selected from the group consisting of nanosheets of graphite, intercalated graphite and expanded graphite;
    incorporating a blowing agent into the polymer melt under a first pressure and at a first temperature;
    extruding the polymer melt under a second pressure and at a second temperature, the second pressure and second temperature being sufficient to allow the polymer melt to expand and form a foam product having a solid foam structure; and
    cooling the solid extruded foam product,
    wherein said foam product comprises at least 90% closed cells having an average cell size between 60 μm and 500

µm; the average cell size is decreased by incorporation of the nano-graphite nucleating agents; having an average cell wall thickness between 0.2 and 1 µm; an average strut diameter between 4 and 8 µm; a cell orientation between 1 and 1.5; and a foam density between 20 and 50 kg/m$^3$.

12. The method according to claim 11, wherein the blowing agent includes at least one composition selected from aliphatic hydrocarbons having 1-9 carbon atoms, halogenated aliphatic hydrocarbons having 1-4 carbon atoms, carbon dioxide, nitrogen, water, azodicarbonamide and p-toluenesulfonyl.

13. The method according to claim 11, wherein the blowing agent includes at least one composition selected from methane, methanol, ethane, ethanol, propane, propanol, n-butane, isopentane, carbon dioxide, nitrogen, water, azodicarbonamide, p-toluenesulfonyl, HCFC-142b and HCFC-134a 14. The method according to claim 11, wherein the nano-graphite is incorporated into the polymer melt in an amount between about 0.5 and 5 weight percent, based on polymer weight.

15. The method according to claim 11, wherein the rigid foam product is extruded into the shape of a rigid board.

16. The method according to claim 11, wherein incorporating the nano-particle nucleating agents increases the asymmetry of the cells.

17. A method of manufacturing a rigid foam board according to claim 11, wherein said nano-particle nucleating agents are the only solid, inorganic nucleating agents.

18. A method of manufacturing a rigid foam board consisting essentially of:
    incorporating nano-particle nucleating agents into a polymer melt consisting of polystyrene, said nano-particle nucleating agents being selected from the group consisting of nanosheets of graphite, intercalated graphites and expanded graphites and having a particle size in at least one dimension of less than 100 nanometers, and wherein no solid nucleating agent other than said nano-particle nucleating agents are incorporated into said polymer melt;
    incorporating a blowing agent into the polymer melt under a first pressure and at a first temperature;
    extruding the polymer melt under a second pressure and at a second temperature, the second pressure and second temperature being sufficient to allow the polymer melt to expand and form a foam board having a solid foam structure; and
    cooling the foam board, said foam board having an average cell size between 60 µm and 500 µm and having a cell size distribution,
    wherein said foam board comprises at least 90% closed cells.

* * * * *